United States Patent [19]

Nicol et al.

[11] Patent Number: 5,429,470
[45] Date of Patent: Jul. 4, 1995

[54] INTER-SYSTEM TRANSPORT MECHANISM FOR USE WITH ROBOTIC DATA CARTRIDGE HANDLING SYSTEMS

[75] Inventors: David H. Nicol, Anaheim; Mark J. Rouillard, El Toro, both of Calif.

[73] Assignee: Odetics, Inc., Anaheim, Calif.

[21] Appl. No.: 964,020

[22] Filed: Oct. 20, 1992

[51] Int. Cl.⁶ .......................................... G11B 15/68
[52] U.S. Cl. .................... 414/331; 414/273; 414/274; 414/277; 414/281; 360/92
[58] Field of Search ............... 414/273, 274, 279, 281, 414/331; 360/92

[56] References Cited

U.S. PATENT DOCUMENTS

| | | | |
|---|---|---|---|
| 3,938,190 | 2/1976 | Semmlow | 360/72 |
| 4,079,841 | 3/1977 | Castel | 211/131 |
| 4,271,440 | 6/1981 | Jenkins et al. | 360/92 |
| 4,438,468 | 3/1984 | Kamei et al. | 360/92 |
| 4,651,863 | 3/1987 | Reuter et al. | 198/339.1 |
| 4,673,090 | 6/1987 | Crosslen | 211/183 |
| 4,675,856 | 6/1987 | Rudy et al. | 369/36 |
| 4,787,533 | 11/1988 | Haroutel et al. | 221/12 |
| 4,836,621 | 6/1989 | Teranishi | 369/98.05 |
| 4,846,619 | 7/1989 | Crabtree et al. | 414/273 |
| 4,903,815 | 2/1990 | Hirschfeld et al. | 194/205 |
| 4,907,889 | 3/1990 | Simone | 360/92 |
| 4,912,575 | 3/1990 | Shiosaki | 360/71 |
| 4,945,429 | 7/1990 | Munro et al. | 360/92 |
| 4,981,409 | 1/1991 | Hirose et al. | 414/225 |
| 4,991,041 | 2/1991 | Grant | 360/92 |
| 5,036,503 | 7/1991 | Tomita | 369/36 |
| 5,041,929 | 8/1991 | Fryberger et al. | 360/92 |
| 5,050,020 | 9/1991 | Campbell, et al. | 360/92 |
| 5,056,073 | 10/1991 | Fitzgerald et al. | 369/36 |
| 5,059,772 | 10/1991 | Younglove | 235/383 |
| 5,144,506 | 9/1992 | Sahota | 360/92 |
| 5,147,176 | 9/1992 | Stolzer et al. | 414/281 X |
| 5,206,814 | 4/1993 | Cahlander et al. | 414/273 X |

FOREIGN PATENT DOCUMENTS

| | | | |
|---|---|---|---|
| 288165 | 10/1988 | European Pat. Off. | 360/92 |
| 3918198 | 2/1990 | Germany | 360/92 |
| 157156 | 12/1980 | Japan | 360/92 |
| 59-186808 | 11/1984 | Japan | B65G 1/133 |
| 60-82509 | 5/1985 | Japan | B65G 1/133 |
| 61-127503 | 6/1986 | Japan | G11B 15/68 |

OTHER PUBLICATIONS

IBM Technical Disclosure Bulletin vol. 16, No. 10 Mar., 1974 R. L. Schaaf, IBM Corp. (Address unknown).

Digital, Owner's Manual For "T×857 Series Magazine Tape Subsystem" (1990).

Honeywell, "Data Storage Rss–600 Rotary Storage System Product Information" (1990).

Sony, "FLEXICART Multi–Cassette System" (date not presently known).

Sony, "DMS—24/15 Digital Mass Storage System" (date not presently known).

*Primary Examiner*—Michael S. Huppert
*Assistant Examiner*—Stephen Gordon
*Attorney, Agent, or Firm*—Graham & James

[57] ABSTRACT

An inter-system transport mechanism for moving data cartridges between robotic data cartridge handling systems in an automated fashion is disclosed. Each data cartridge handling system includes a carousel-type storage mechanism for storing a plurality of data cartridges. A gripper mechanism comprising a gripper assembly, an extension axis assembly, and a vertical rail assembly is provided to transport the data cartridges to the storage mechanism and the inter-system transport mechanism.

10 Claims, 6 Drawing Sheets

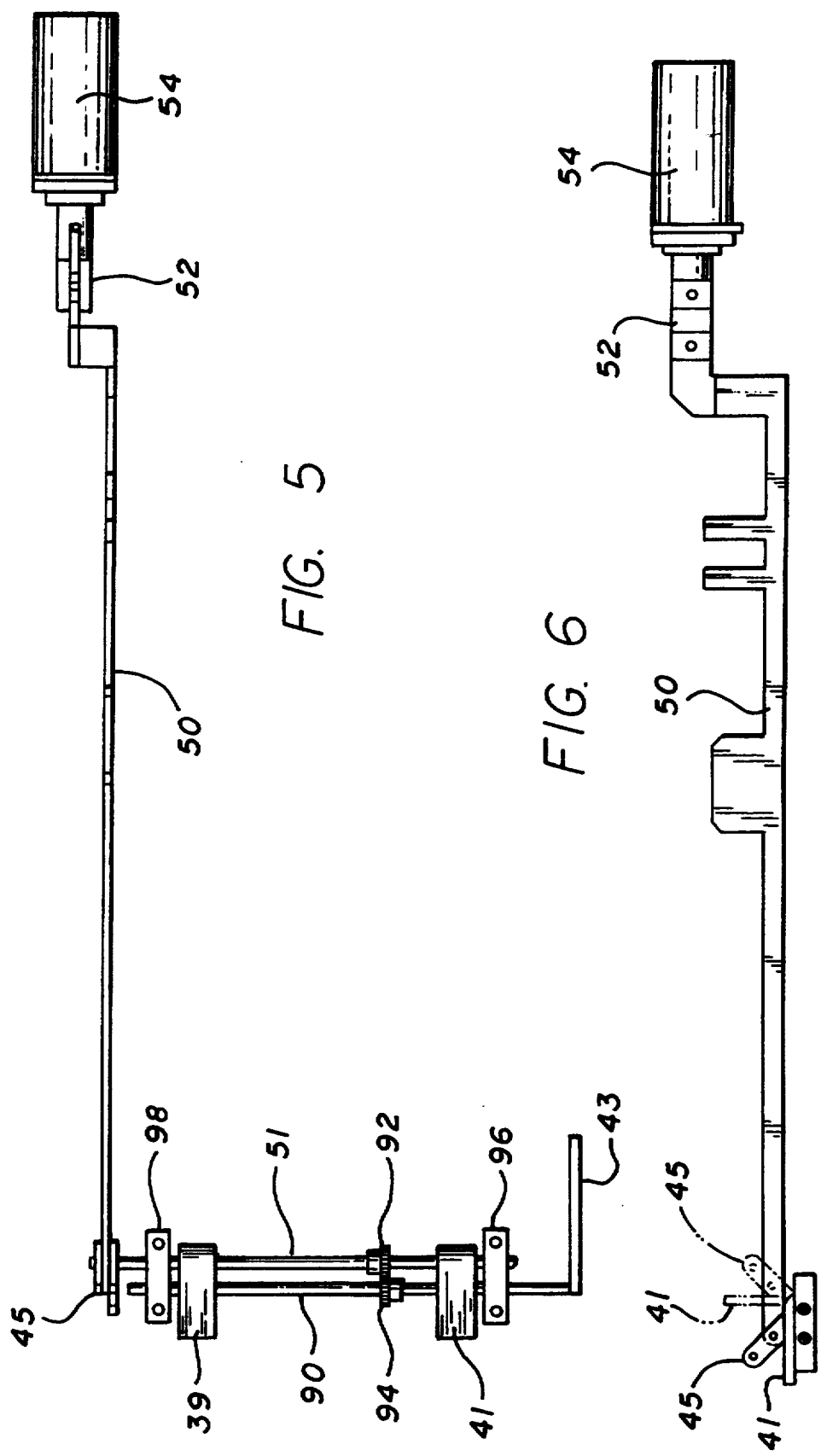

INTER-SYSTEM TRANSPORT MECHANISM FOR USE WITH ROBOTIC DATA CARTRIDGE HANDLING SYSTEMS

FIELD OF THE INVENTION

The present invention relates to robotic systems for rapidly and reliably handling data cartridges in an automated data cartridge library. More particularly, the present invention relates to a mechanism for transporting data cartridges between two or more robotic storage assemblies.

BACKGROUND OF THE INVENTION

Automated systems for storing tapes in a storage location and moving the tapes between the storage location and a tape drive are known in the prior art. Most of these prior art storage systems are designed to store and handle tapes containing audio and video data, such as television programs and commercials, which are housed in a single storage assembly. Associated with the storage assembly is at least one and preferably a plurality of tape drives, each of which is adapted to receive and play at least one of the tapes held in the storage assembly. While the tapes could be manually moved between the storage assembly and the tape drives, it is expedient to have a computer-controlled device which can be pre-programmed to select a tape, remove it from the storage assembly, transport it to the tape drive, insert the tape into the tape drive and, upon completion of play, remove the tape from the tape drive and return it to the storage assembly.

Some prior art systems use a circular storage configuration for storing the tapes. For example, U.S. Pat. No. 4,846,619 entitled "Robotic Materials Handling System", and issued Jul. 11, 1989 to Crabtree, et al., discloses a system for storing and handling box-like articles such as video cassettes. The system includes a storage area containing a plurality of columns of storage bins which are configured around the inside of a cylindrical storage area. A vertical shaft extends through the center of the cylindrical storage area and includes a manipulator assembly that is carried on the shaft. The manipulator assembly further includes a plurality of gripper mechanisms which may be positioned to load and unload the video cassettes from the storage bins.

U.S. Pat. No. 4,271,440 entitled "Automatic Tape Cartridge Handling System", issued Jun. 2, 1981 to Jenkins, et al., discloses a microcomputer-controlled tape cartridge handling system. The system includes two storage drums in a cylindrical configuration with 512 cartridge storage compartments arranged in 16 vertical columns around the circumference of the drum. Two tape cartridge transfer mechanisms are located adjacent to the two storage drums. The tape cartridge transfer mechanisms may be positioned to remove tape cartridges from either of the two storage drums.

Another storage system is disclosed in U.S. Pat. No. No. 3,938,190 entitled "Storage and Retrieval System for Magnetic Tape Cassettes", and issued Feb. 10, 1976 to Semmlow et al. This patent discloses a system for storing and retrieving information-bearing modules such as magnetic tape cassettes. The system includes a fixed two-dimensional storage array, a fixed processing or play station for extracting information from the information-bearing modules, and a movable selection mechanism having three degrees of freedom. This system is designed to provide simple and inexpensive access to a large store of audio or video cassettes. The system can also be used with compact disks, phonograph records, microfilm, microfiche, photographic slides, film cassettes, or non-informational items such as stock selection from a warehouse.

Despite the existence of these prior art storage and retrieval systems, there is a need for a mechanism for transporting data cartridges in an automated fashion between two or more storage assemblies in order to increase the available storage capacity and processing capability of the system (e.g. to run a number of data cartridges which are stored in the same storage assembly which is greater than the number of drives associated with that storage assembly).

SUMMARY OF THE INVENTION

The present invention is directed to a mechanism for transporting data cartridges between two or more robotic storage assemblies in a robotic data cartridge handling system. Each robotic storage assembly includes a carousel-type storage mechanism containing a plurality of removable data cartridge packs. Each data cartridge pack is designed for easy removal from the storage mechanism, and while providing storage for a plurality of data cartridges. Additionally, one or more tape drives may be mounted on adjustable tape drive shelves located adjacent to the storage mechanism. The adjustable shelves permit a wide range of tape drive configurations to be installed in the robotic storage assembly. Further, the tape drive shelves may be of a slide-type to provide easy access for servicing and/or replacement of the tape drives.

Each robotic storage assembly also includes a gripper mechanism for transporting data cartridges within the storage assemblies. Each gripper mechanism includes a gripper assembly, an extension axis assembly, and a vertical rail assembly. The gripper assemblies move horizontally on their corresponding extension axis assemblies which, in turn, move vertically on their vertical rail assemblies. The vertical rail assemblies are mounted in the respective front door of the robotic storage assembly. Each gripper assembly grasps the data cartridges and moves them to the storage mechanism and the tape drives for storing, reading or recording data.

Each robotic storage assembly further includes an inter-system transport mechanism for transporting data cartridges between the storage assemblies. Each inter-system transport mechanism comprises a frame assembly, a transport assembly, a drive assembly, a sensor assembly and a gate assembly. The frame assembly provides a channel along which a data cartridge moves while being transported between the robotic storage assemblies. The transport assembly is attached to the frame assembly and includes a pair of conveyor belts which carry the data cartridge along the frame assembly. The conveyor belts are driven by the drive assembly, while the sensor assembly senses the position of the data cartridge as it moves along the frame assembly. The gate assembly is activated in order to stop the data cartridge movement and allow the gripper assembly to insert and remove the data cartridge from the inter-system transport mechanism. An inter-system transport mechanism is mounted within each robotic storage assembly adjacent to the carousel-type storage mechanism.

For example, in response to a command from a host computer the robotic storage assembly in which the desired data cartridge is stored (the "source" storage assembly) positions the source storage mechanism to allow the data cartridge to be accessed by the gripper assembly. The source gripper assembly is moved to the storage location containing the desired data cartridge, and the data cartridge is extracted from the storage mechanism by the source gripper assembly. The source gripper assembly moves the extracted data cartridge to the front of the inter-system transport mechanism, and inserts the extracted data cartridge into the inter-system transport mechanism.

Upon receipt of the data cartridge, the inter-system transport mechanism transports the data cartridge to a "destination" robotic storage assembly. The destination storage assembly need not be located adjacent to the source storage assembly. However, if the destination storage assembly is not located adjacent to the source storage assembly, the intervening storage assemblies will "pass" the data cartridge along using their inter-system transport mechanisms.

When the data cartridge has been transported to the destination storage assembly, the destination gripper assembly is positioned to extract the data cartridge from the inter-system transport mechanism. The data cartridge is extracted from the storage mechanism by the destination gripper assembly and is moved to the destination storage mechanism for storage, or to a destination tape drive for reading the data.

Each robotic storage assembly further includes an inventory control system for maintaining a current inventory of data cartridges that are stored in its storage mechanism. The inventory is created when the robotic data cartridge handling system is powered on, and the inventory information is stored in a local memory. In addition, the inventory information is updated when either the front door of the robotic data cartridge handling system is opened or when a data cartridge is transported to another robotic storage assembly, thus assuring that the inventory of each robotic storage assembly remains current.

BRIEF DESCRIPTION OF THE DRAWINGS

The present invention will be described with reference to the accompanying drawings, wherein:

FIG. 5 is a top view of a gate assembly of the inter-system transport mechanism;

FIG. 6 is a front view of the gate assembly of FIG. 5;

DETAILED DESCRIPTION OF THE PREFERRED EMBODIMENT

Figure 1:
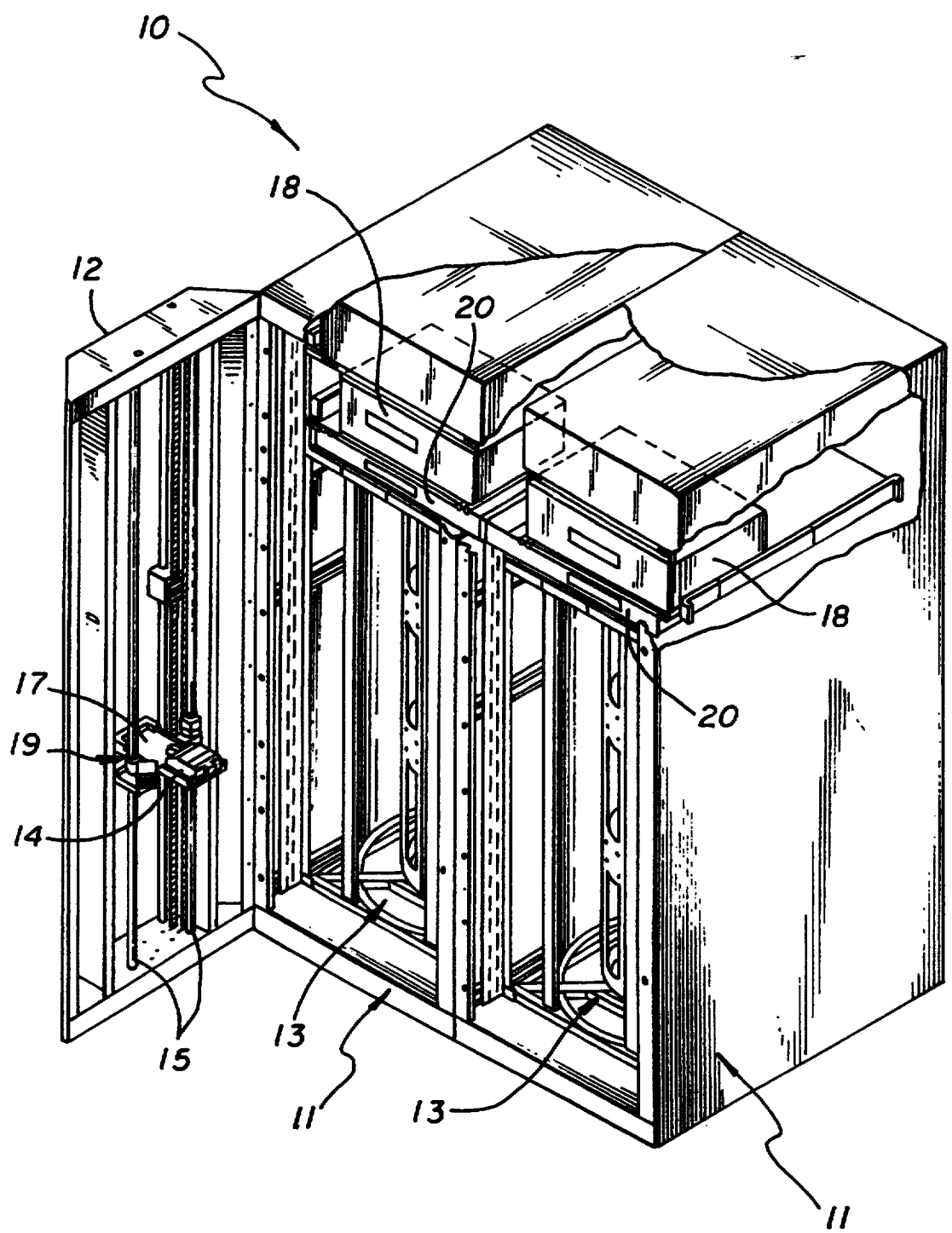
FIG. 1 is a perspective view of two robotic storage assemblies showing the location of the inter-system transport mechanisms of the present invention.

Referring to FIG. 1, a partially cutaway view of a pair of robotic storage assemblies 10 is shown. Each of the pair of storage assemblies 10 is disposed in a cabinet 11 which includes an access door 12 (only one access door is shown) attached to the front face. One or more tape drives 18 as well as a carousel-type storage mechanism 13 is mounted within each cabinet 11. A gripper mechanism 19 is also mounted in the access door 12, to move data cartridges between the storage mechanism 13 and one of the tape drives 18. The provision of the gripper mechanism 19 in the door enables the gripper mechanism 19 to be moved away from the storage mechanism 13 to allow manual loading and unloading of data cartridges into the storage mechanism 13.

Figure 9:
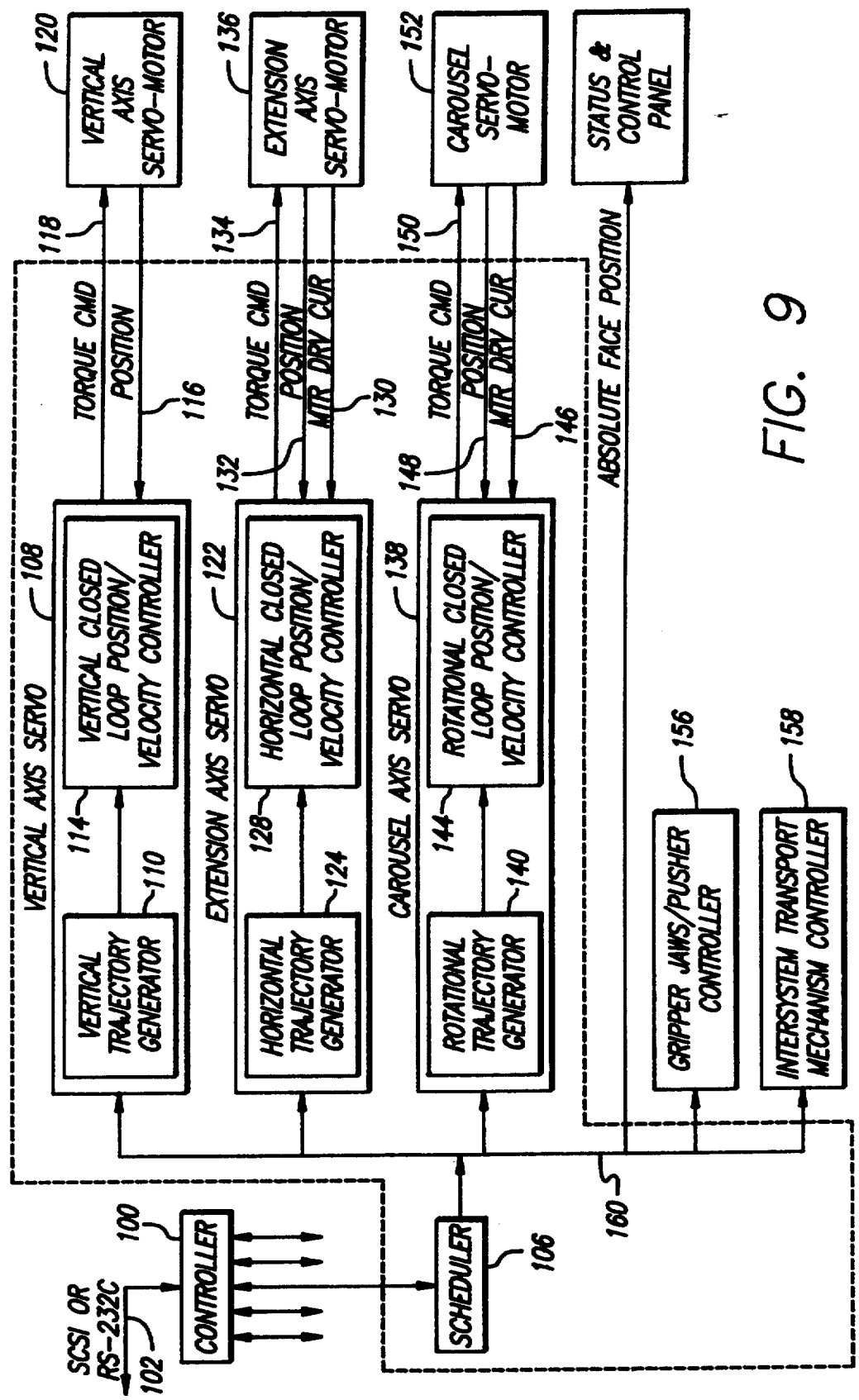
FIG. 9 is a simplified block diagram which illustrates the architecture and function of the control system of the present invention.

The gripper mechanism 19 further includes a gripper assembly 14 which is mounted on a horizontal extension axis assembly 17, and which is controlled by a gripper controller (FIG. 9). The extension axis assembly 17 allows the gripper assembly 14 to move horizontally to and from the storage mechanism 13 to remove or insert data cartridges. The extension axis assembly 17 also allows the gripper assembly 14 to move horizontally to and from the tape drives 18 to insert or remove a data cartridge. The horizontal motion of the gripper assembly 14 is provided by an extension axis servo-motor (FIG. 9). Further, the extension axis assembly 17 is slidably mounted on a pair of vertical rails 15. The vertical rails 15 allow the gripper assembly 14 and the extension axis assembly 17 to move vertically between the storage mechanism 13 and the tape drives 18.

Each of the pair of storage assemblies 10 also includes a inter-system transport mechanism 20 for transporting data cartridges between the pair of storage assemblies 10, and for importing and exporting data cartridges to and from each of the pair of storage assemblies 10. Each inter-system transport mechanism 20 includes a frame assembly, a transport assembly, a drive assembly, a sensor assembly and a gate assembly. The frame assembly provides a channel along which a data cartridge moves while being transported into, within, between and out of the robotic storage assemblies. The transport assembly is attached to the frame assembly and includes a pair of conveyor belts which carry the data cartridge along the frame assembly. The conveyor belts are driven by the drive assembly, while the sensor assembly senses the position of the data cartridge as it moves along the frame assembly. The gate assembly is activated in order to stop the data cartridge movement and allow the gripper mechanism 19 to insert and remove the data cartridge from the inter-system transport mechanism 20.

Figure 2:
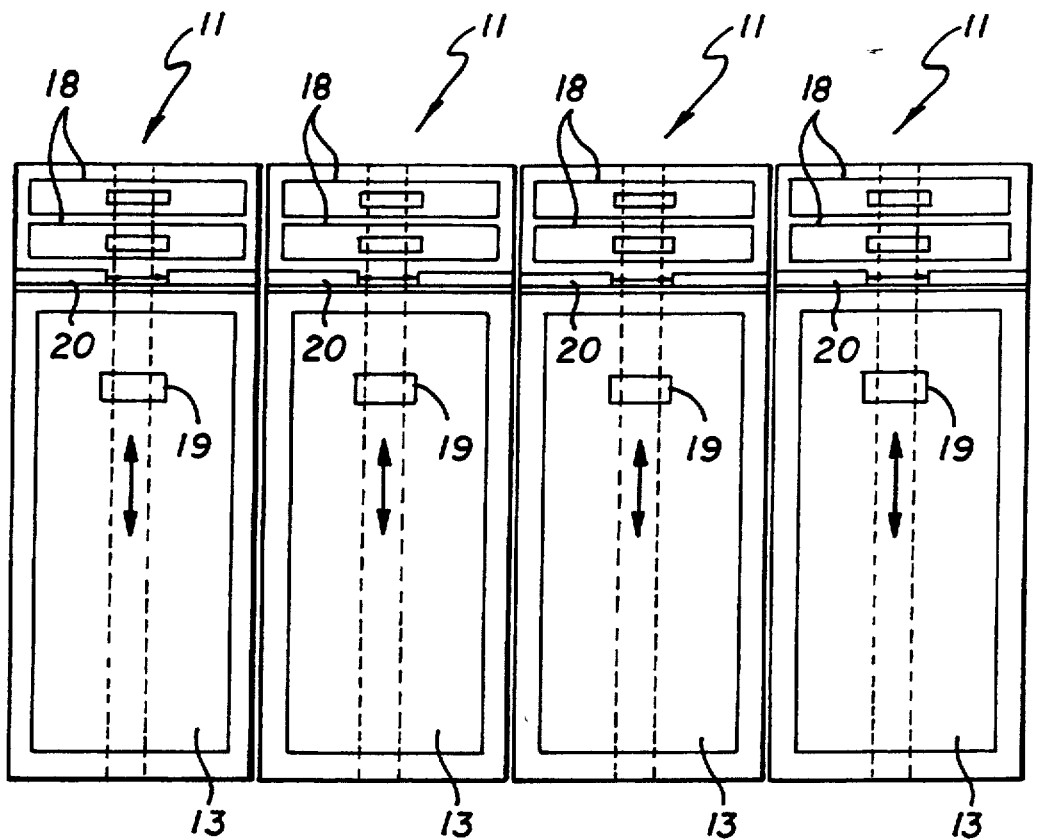
FIG. 2 is a front view of four robotic storage assemblies showing the transporting of a data cartridge from one storage assembly to another.

Each inter-system transport mechanism 20 operates in an independent but coordinated manner to transport data cartridges between the pair of storage assemblies 10. Additionally, as shown in FIG. 2, a storage system of virtually any size may be created using the storage assemblies 10 and inter-system transport mechanisms 20 of the present invention. More particularly, an inter-system transport mechanism 20 is associated with each storage assembly 10 and is located adjacent to the corresponding storage mechanism 13 and gripper mechanism 19. The gripper mechanism 19 moves the data cartridges vertically between the storage mechanism 13 and the inter-system transport mechanism 20. The inter-system transport mechanism 20, in turn, moves the data cartridges horizontally between the storage assemblies 10.

Figure 3:
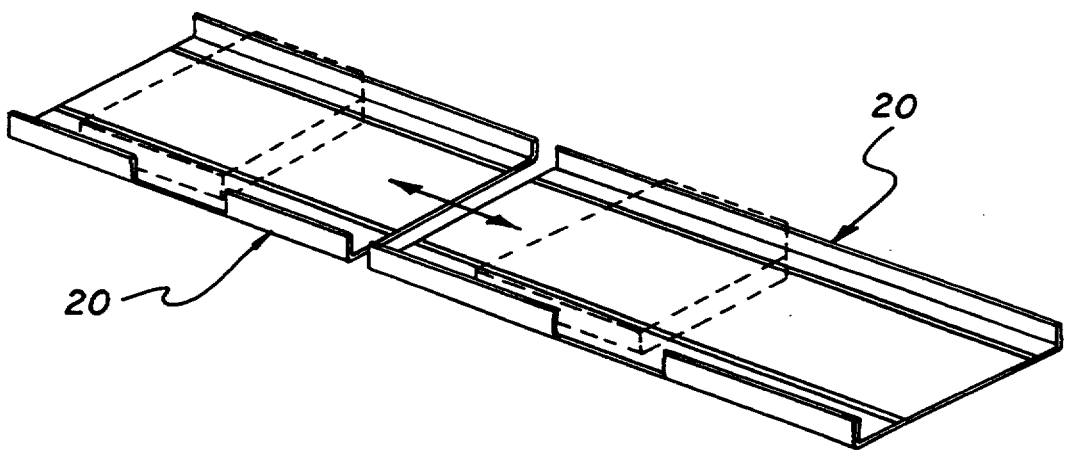
FIG. 3 is a perspective view showing a data cartridge being passed between two inter-system transport mechanisms.

The independent but coordinated movement of the data cartridges is achieved by using a multi-unit controller ("MUC") 100 (FIG. 9) to coordinate the operations of each of the inter-system transport mechanisms 20 with each other and with their corresponding storage mechanism 13 and gripper mechanism 19. As shown in FIG. 3, when a data cartridge is being transported from one of the storage assemblies 10 to another, the inter-system transport mechanisms 20 operate to independently move the data cartridge across their corresponding storage assembly 10. When the data cartridge being transported reaches the end of an inter-system transport mechanism 20, the data cartridge is passed to the adjacent inter-system transport mechanism 20 and the transporting of the data cartridge continues. When the data cartridge leaves an inter-system transport mechanism 20, that inter-system transport mechanism is free to execute additional data cartridge moves.

Figure 4:
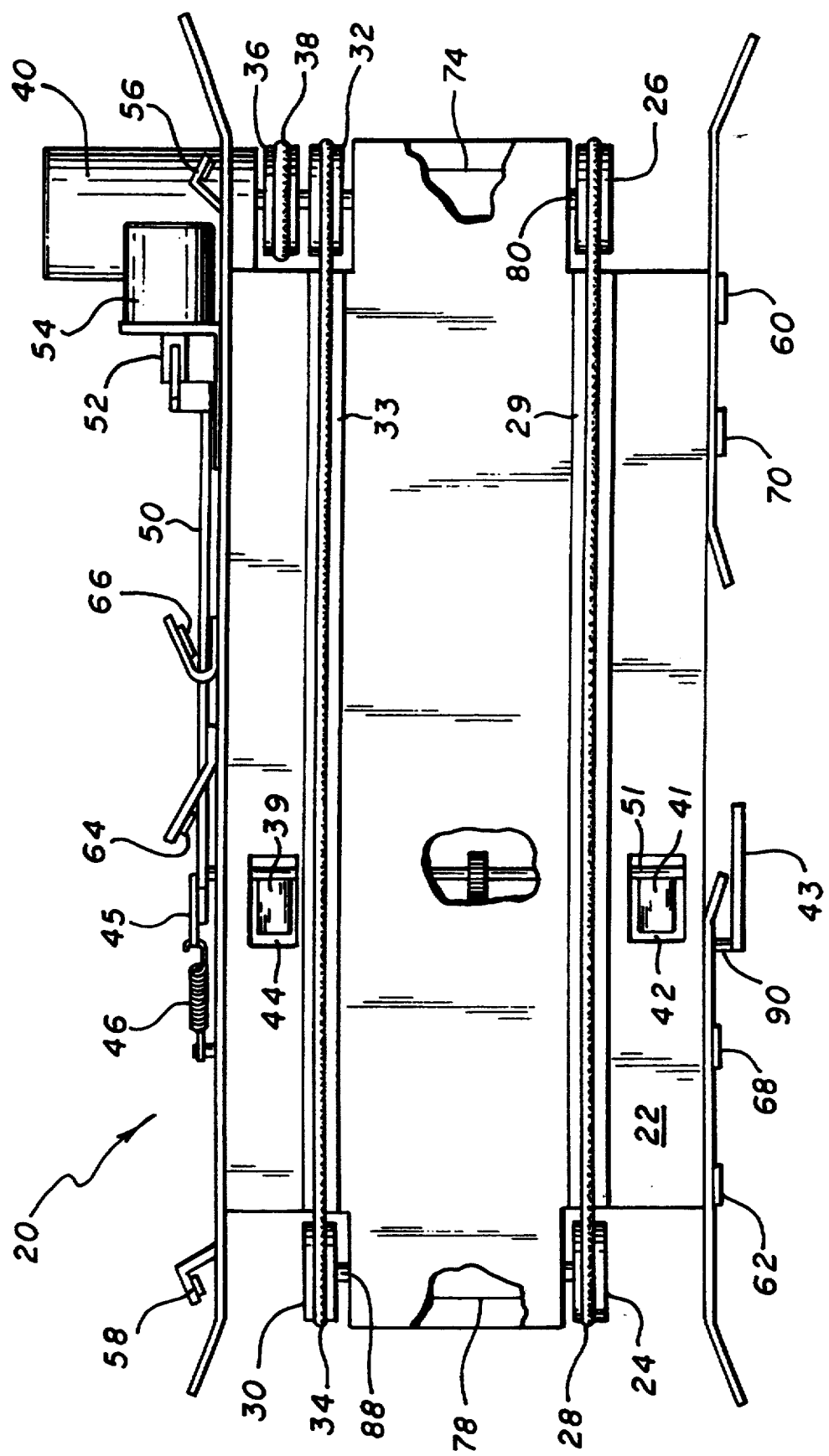
FIG. 4 is a top view of an inter-system transport mechanism of the present invention.

Referring now to FIG. 4, a top view of the inter-system transport mechanism 20 is shown. As mentioned above, the inter-system transport mechanism 20 includes a frame assembly, a transport assembly, a drive assembly, a sensor assembly and a gate assembly. The frame assembly includes a frame 22 constructed of aluminum or other material having sufficient mechanical strength to support the other assemblies and the data cartridge while it is being transported. In the preferred embodiment, the frame 22 is formed into a channel shape using a single sheet of aluminum. The channel shape of the frame assembly provides easy access to the data cartridge in the event of a jam. The side walls of the channel are used to maintain the orientation of the data cartridge as it moves along the transport mechanism, and to provide a mounting structure for portions of the sensor and gate assemblies. Additionally, at each end of the frame 22 the side walls are bent outward to improve the passing of the data cartridge between adjacent inter-system transport mechanisms 20. Further, the frame 22 is approximately one-half inch shorter than the width of the cabinet 11 and is mounted so that a gap of about one-quarter inch is present between each end of the frame 22 and the adjacent sides of the cabinet 11. An access opening is provided in the adjacent sides of the cabinets 11 between which the data cartridges are passed by the inter-system transport mechanism 20.

The transport assembly includes two conveyor belts 28, 34 each of which is mounted on a pair of pulleys 24, 26, 30 and 32. The pulleys are mounted on shafts 80 and 88 which are, in turn, mounted in bearing blocks 74 and 78 at opposite ends of the frame 22. Shaft 80 is longer than shaft 88 to provide additional mounting space for drive pulley 36. In order to reduce the friction between the conveyor belts 28, 34 and the frame 22, a strip of plastic material 29 and 33 is mounted along the length of the top surface of the base beneath each of the conveyor belts 28 and 34, respectively. The conveyor belts 28 and 34 provide a simple and reliable way to transport the data cartridges. The use of the conveyor belts 28 and 34 also provides for easy clearing of a jammed data cartridge and ease of servicing.

Continuing with FIG. 4, the sensor assembly consists of photo-emitters 56, 58, 64 and 66 and corresponding photo-detectors 60, 62, 68 and 70. The photo-emitters 56, 58, 64 and 66 and corresponding photo-detectors 60, 62, 68 and 70 operate in pairs to determine the position of a data cartridge as it moves along the frame 22. Specifically, photo-emitter 58 and photo-detector 62 detects when the data cartridge enters or exits the transport mechanism from the left, while photo-emitter 56 and photo-detector 60 detect when the data cartridge enters or exits the transport mechanism from the right. Similarly, photo-emitter 64 and photo-detector 68 detect when the data cartridge has reached the appropriate position for removal by the gripper assembly 14, or to ensure proper insertion of the data cartridge by gripper assembly 14. Finally, photo-emitter 66 and photo-detector 70 are used to profile the velocity of the data cartridge. The photo-emitters 56 and 58 and photo-detectors 60 and 62 are angled with respect to the frame 22 in order to provide a much broader area to be covered to detect incoming or outgoing data cartridges. Additionally, the angling of the photo-emitter 64 and photo-detector 68 near the gates 39 and 41 further allows the corner of the data cartridge to be detected, thus ensuring that the data cartridge is fully seated against the gates 39 and 41 (for proper retrieval by the gripper mechanism 19), or is fully inserted in the fore-aft direction (for proper conveyance along the inter-system transport mechanism).

The gate assembly is used to mechanically position the data cartridge for insertion or extraction by the gripper assembly 14. Referring to FIGS. 4, 5 and 6, the gate assembly preferably includes gates 39 and 41 which are attached to a rotating shaft 51, a blocking flag 43 which is attached to a counter-rotating shaft 90, a pair of gears 92 and 94 attached respectively to shafts 51 and 90, a pair of supporting blocks 96 and 98 in which the shafts 51 and 90 rotate, a linkage 45, a push-pull linkage 50, a plunger 52 and a solenoid 54. The gate assembly is mounted to the frame 22 as shown in FIG. 4, so that the gates 39 and 41 are positioned in openings 42 and 44 in the base of the frame 22, and may be rotated upward into a position perpendicular with the base of frame 22. When in the perpendicular position, the gates 39 and 41 are used to position the data cartridge for removal from the inter-system transport mechanism 20.

When the gates 39 and 41 are in the lowered position, the blocking flag 43 is positioned horizontally to block manual insertion or removal of a data cartridge by an operator. When the gates 39 and 41 are in the perpendicular position, the blocking flag 43 is positioned vertically to allow insertion or removal of a data cartridge by the gripper assembly 14. The push-pull linkage 50 is connected to the linkage 45 at one end and to the plunger 52 at the other end. The combination of the push-pull linkage 50, the linkage 45 and the plunger 52 converts the push-pull motion of the solenoid 54 into the rotational motion needed to raise and lower the gates 39, 41 and the blocking flag 43. The gears 92 and 94 cause the shafts 51 and 90 to rotate in opposite directions with respect to each other, thus providing the counter-rotating motion of the gates 39, 41 and the blocking flag 43. The spring 46 provides a pull force to return the gates 39 and 41, and the blocking flag 43 to a lowered (blocking) position when the solenoid 54 is unpowered.

The sensor assembly and gate assembly function together to position the data cartridge for retrieval by the gripper mechanism 19. If the data cartridge is entering the inter-system transport mechanism 20 from the left (when viewing mechanism 20 from the front), the gates 39 and 41 are maintained in the lowered position until the data cartridge passes over the them and breaks the light paths of photo-emitter 64 and photo-detector 68 and of photo-emitter 66 and photo-detector 70. When this occurs, the motion of the data cartridge is stopped, the gates 39 and 41 are raised to the perpendicular position, and the data cartridge is then moved back toward the gates until it again breaks the light path of photo-emitter 64 and photo-detector 68 and is stopped.

If the data cartridge is entering the inter-system transport mechanism 20 from the right, the gates 39 and 41 are already in the raised position. The data cartridge moves toward the gates until it breaks the light path of photo-emitter 66 and photo-detector 70. When this occurs, the motion of the data cartridge is slowed down until it breaks the light path of photo-emitter 64 and photo-detector 68 and is stopped.

Figures 7, 8:
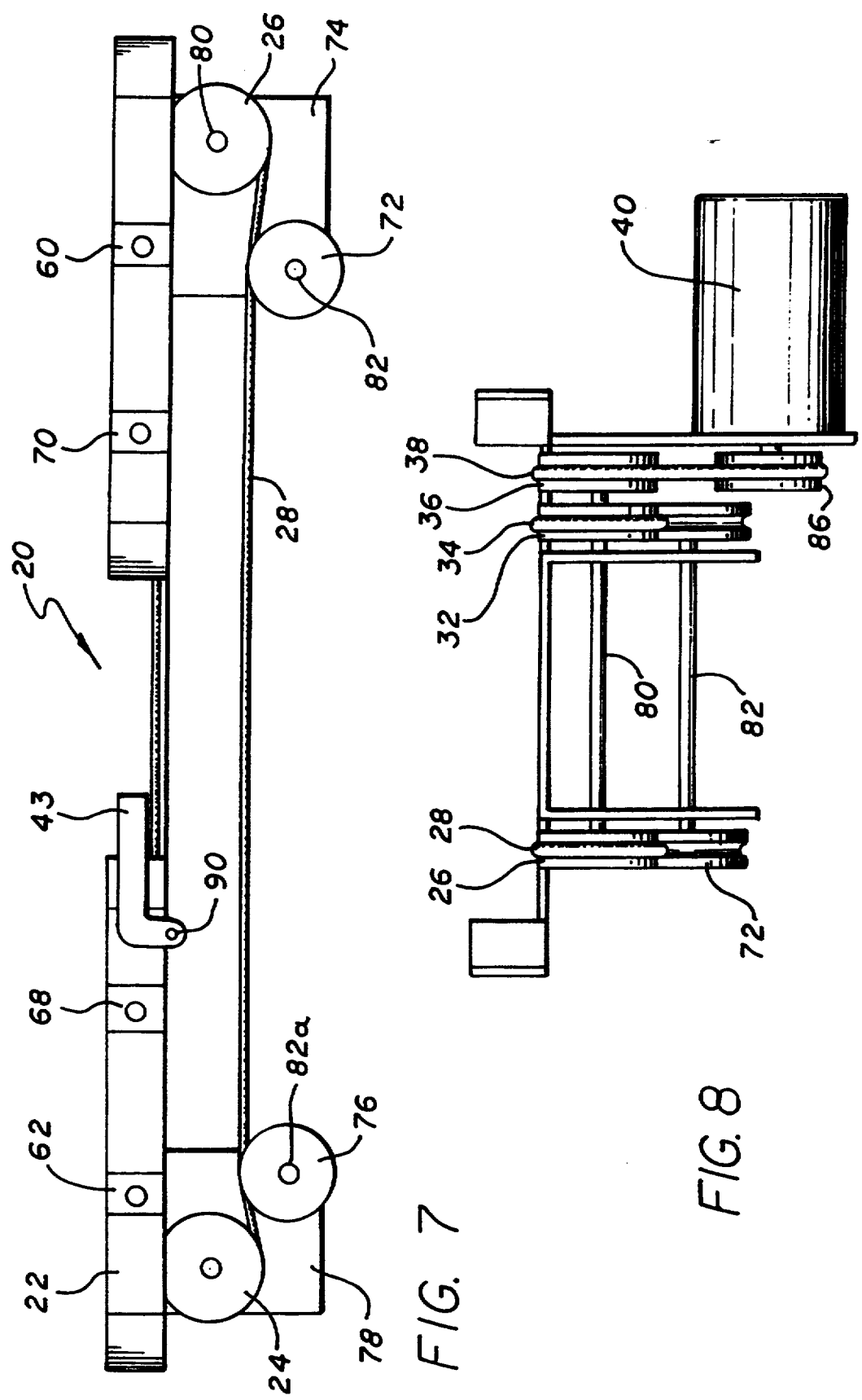
FIG. 7 is a front view of an inter-system transport mechanism of the present invention.
FIG. 8 is an end view of an inter-system transport mechanism of the present invention.

In FIG. 7, a front view of the inter-system transport mechanism 20 is shown. The front view shows more clearly how blocking flag 43 blocks the opening in which data cartridges are inserted or removed from transport mechanism 20 by gripper assembly 14. Also shown are two idler pulleys 76 and 72 which are used to cause conveyor belt 28 on the underside of frame 22 to reduce assembly height in the area of conveyor belt 28. A similar pair of idler pulleys (not shown) does the same for conveyor belt 34. Similar to pulleys 24, 26, 30, 32 and 36, idler pulleys 72 and 76 are mounted to shafts 82 and 82a which are supported by bearing blocks 74 and 78.

FIG. 8 is an end view of the inter-system transport mechanism 20 which shows the connection of the drive assembly to the transport assembly. The drive assembly includes a drive motor 40, a pair of drive pulleys 36 and 86, and a drive belt 38. As mentioned above, the drive pulley 36 is mounted directly to the shaft 80 which also supports the pulleys 26 and 32. The drive pulley 86 is mounted directly to the shaft of the drive motor 40. The drive motor 40 is a precision DC servomotor which provides sufficient torque and speed to drive the transport assembly.

The architecture and function of the control of the robotic storage assemblies 10 will now be discussed with reference to FIG. 9. As shown in FIG. 9, the MUC 100 receives commands from a host computer (not shown) via a communication line 102. The MUC 100 routes each of the commands received from the host computer to a scheduler 106. The scheduler 106 schedules the commands received from the MUC 100 to a vertical axis servo-controller 108, an extension axis servo-controller 122, or a carousel axis servo-controller 138, as required. Additionally, the scheduler 106 forwards commands to the gripper controller 156 for controlling the opening and closing of the gripper jaws of the gripper assembly 74. The scheduler 106 also forwards commands to the inter-system transport controller 158 for controlling the transfer of data cartridges between the robotic storage assemblies 10.

The vertical axis servo-controller 108 controls the vertical movement of the inter-system transport mechanism 20, and further comprises a vertical trajectory generator 110 and a vertical closed-loop position/velocity controller 114. The combination of the vertical trajectory generator 110 and the vertical closed-loop position/velocity controller 114 generates torque commands which are sent to the vertical axis servo-motor 120 via a signal path 118. The vertical axis servo-motor 120, in turn, drives the data cartridge gripper mechanism 19 along the vertical rails 15. A position encoder (not shown) attached to the vertical axis servo-motor 120 returns the vertical position information to vertical axis servo-controller 108 via a signal path 116.

The extension axis servo-controller 122 is further comprised of a horizontal trajectory generator 124 and a horizontal closed-loop position/velocity controller 128. The combination of the horizontal trajectory generator 124 and the horizontal closed-loop position/velocity controller 128 generates torque commands which are sent to the extension-axis servo-motor 136 via a signal path 134. The extension axis servo-motor 136 drives the gripper assembly 14 horizontally along the extension axis assembly 17. A position encoder (not shown) attached to the extension axis servo-motor 136 returns horizontal position information to the horizontal extension axis servo-controller 122 via a signal path 132.

The extension axis servo-motor 136 also returns a signal proportional to its servo-motor drive current to the extension axis servo-controller 122 via a signal path 130. The servo-motor drive current signal received from the extension axis servo-motor 136 is used by the extension axis servo-controller 122 to determine the torque being applied by the extension axis servo-motor 136 when inserting a data cartridge into the tape drive 18. This torque value is used in conjunction with the returned position information to control the motion of the gripper assembly 14.

The carousel axis servo-controller 138 is further comprised of a rotational trajectory generator 140 and a rotational closed-loop position/velocity controller 144. The combination of the rotational trajectory generator 140 and the rotational closed-loop position/velocity controller 144 generates torque commands which are sent to the carousel servo-motor 152 via a signal path 150. The carousel servo-motor 152 rotates the storage mechanism 13. A position encoder (not shown) is attached to the carousel servo-motor 152 and returns rotational position information to the carousel axis servo-controller 138 via a signal path 148.

The carousel servo-motor 152 also returns a signal proportional to its servo-motor drive current to the carousel axis servo-controller 138 via a signal path 146. The carousel axis servo-controller 138 uses the drive current signal to identify error conditions.

The transfer of a data cartridge between the robotic storage assemblies 10 will now be discussed with reference to FIGS. 4, 5, 6 and 9.

When the robotic storage assemblies 10 are first powered on, or if one or more of the access doors 12 are opened, portions of the affected storage mechanisms 13 are inventoried to determine the location and identity of each of the stored data cartridges. Specifically, the storage mechanism 13 is inventoried by scanning a bar code on each data cartridge using a bar code reader attached to the gripper mechanism 19 (not shown), and storing the location and identity of the scanned data cartridge in a memory. Any storage locations without valid bar codes are probed by the gripper mechanism 19 (by means of photo-sensors in the gripper assembly 14) to determine whether or not a data cartridge is present. If a data cartridge is not present then the corresponding location is marked empty. If the bar code for the data cartridge is unreadable, then the corresponding location is marked full and unlabeled.

When a data cartridge is to be transported from the storage mechanism 13 to the inter-system transport mechanism 20, the following sequence of steps occurs. Referring to FIGS. 1 and 9, the host first sends a command to to the MUC 100 to move a data cartridge. The MUC 100 sends a command to the scheduler 106 which, in turn, sends a command via the signal path 160 to the carousel axis servo-controller 138 to rotate the storage mechanism 13 to position the desired data cartridge on the front face for grasping by the gripper assembly 14. Concurrently, the scheduler 106 sends a command to the vertical axis servo-controller 108 to move the gripper mechanism 19 vertically along the vertical rails 15 until the gripper assembly 14 is aligned with the selected data cartridge. The scheduler 106 then sends a command to the extension axis servo-controller 122 to extend the gripper assembly 14 horizontally to grasp the selected data cartridge. The scheduler 106 sends a command to the gripper controller 156 to grasp the selected data cartridge.

After the gripper assembly 14 has grasped the selected data cartridge, the scheduler 106 continues by sending a command to the extension axis servo-controller 122 to extract the selected data cartridge from the storage mechanism 13 by moving the gripper assembly 14 horizontally away from the storage mechanism 13. The scheduler 106 then sends a command to the vertical axis servo-controller 108 to move the gripper mechanism 19 vertically along the vertical rails 15 until the extracted data cartridge is aligned with the opening of the inter-system transport mechanism 20. The scheduler 106 then sends a command to the extension axis servo-controller 122 to insert the extracted data cartridge into the opening of the first ("source") inter-system transport mechanism 20, by moving the gripper assembly 14 horizontally toward the inter-system transport mechanism 20. The scheduler 106 then sends coordinated commands to the gripper controller 156 to release the data cartridge, and to the extension axis servo-controller 122 to push it into the source inter-system transport mechanism 20.

After the data cartridge to be transported is properly located in the source inter-system transport mechanism 20, all inter-system transport mechanisms other that the source are started. The inter-system transport mechanism controller 158 then lowers the gates 39, 41 and the blocking flag 43 of the source gate assembly. Controller 158 then activates the source drive assembly to move the data cartridge by driving the source transport assembly in the appropriate direction. The source sensor assembly detects the data cartridge as it exits the source inter-system transport mechanism 20.

Similarly, the sensor assembly of the next inter-system transport assembly 20 detects when the data cartridge enters. The data cartridge is passed from one inter-system transport mechanism 20 to another under control of the MUC 100. Specifically, the inter-system transport mechanism controller 158 causes each drive assembly to move the data cartridge from one inter-system transport mechanism to the adjacent system. As the data cartridge is passed to the adjacent system, a completion notice is sent by the inter-system transport mechanism controller 158 to the MUC 100, and the inter-system transport mechanism from which the data cartridge exited is turned off.

When the data cartridge reaches the destination inter-system transport mechanism 20, it is detected by the destination sensor assembly and the inter-system transport mechanism controller 158 raises the gates 39, 41 and the blocking flag 43 of the destination gate assembly. The inter-system transport mechanism controller 158 then activates the destination drive assembly to position the data cartridge for retrieval by the destination gripper assembly. More particularly, the inter-system transport mechanism controller 158 registers the data cartridge against gates 39 and 41 (by either all forward motion or a combination of forward and reverse motion, depending on the direction of entry with respect to the gates 39 and 41), and the bar code scanner inventories the data cartridge. The data cartridge is then ready for retrieval by the destination gripper assembly 14.

Continuing with FIGS. 1 and 9, to retrieve the data cartridge from the inter-system transport mechanism 20, the following sequence of steps occurs. First, the scheduler 106 sends a command to the vertical axis servo-controller 108 to move the gripper mechanism 19 vertically along the vertical rails 15 until the gripper assembly 14 is aligned with the inter-system transport mechanism 20. The scheduler 106 then sends a command to the extension axis servo-controller 122 to extend the gripper assembly 14 horizontally to grasp the data cartridge. The scheduler 106 then sends a command to the gripper controller 156 to grasp the data cartridge. Next, the scheduler 106 sends a command to the extension axis servo-controller 122 to extract the data cartridge from the inter-system transport mechanism 20 by moving the gripper assembly 14 horizontally away from the inter-system transport mechanism 20.

The scheduler 106 continues by sending a command to the vertical axis servo-controller 108 to move vertically along the vertical rails 15 until the gripper assembly 14 is aligned either with a storage location within the storage mechanism 13 or one of the tape drives 18. If the data cartridge is being stored, the scheduler 106 concurrently sends a command to the carousel axis servo-controller 138 to rotate the storage mechanism 13 until the proper storage location is in position to receive the data cartridge. The scheduler 106 then sends a command to the extension axis servo-controller 122 to move the gripper assembly 14 horizontally toward the storage mechanism 13 until the data cartridge is inserted in the proper storage location. Next, the scheduler 106 sends a command to the gripper controller 156 to release the data cartridge. The scheduler 106 then sends a command to the extension axis servo-controller 122 to move the gripper assembly 14 horizontally away from the storage mechanism 13 which completes the transfer of the data cartridge. Finally, the scheduler 106 sends a completion notice to the MUC 100 which, in turn, sends a completion notice to the host.

The inter-system transport mechanism 20 can also import or export a data cartridge through the side of one of the cabinets 11. The basic steps for importing a data cartridge are identical to those used to transport the data cartridge from one cabinet to another, with the following exceptions. The host first sends a command to the MUC 100 indicating that it is ready to import a data cartridge into one of the robotic storage mechanisms. In response, the inter-system transport mechanism controller 158 unlocks an import door and signals the operator that the mechanism is ready to receive the data cartridge. The operator then opens the import door and inserts the data cartridge. The inter-system transport mechanism controller 158 then sends a command to the host indicating that the data cartridge is in position to be imported. The remaining steps are the same described above in connection with transporting a data cartridge between cabinets.

The steps for exporting a data cartridge are also indentical to those used to transport a data cartridge, except that the inter-system transport mechanism controller 158 sends a completion notice to the MUC 100 when the data cartridge has been exported out of the cabinet. The MUC 100 then sends a command complete status to the host.

By providing robotic storage assemblies with a vertically moving gripper mechanism and a horizontally moving inter-system transport mechanism, a simple and reliable way of transporting the data cartridges between robotic storage assemblies is provided. This in turn provides a potentially unlimited expansion in storage capability to provided data storage for one or more host computers. A user can add storage mechanisms as his storage needs change, and the inter-system transport mechanism can be easily installed without having to return the system to the factory.

While a preferred embodiment of the present invention has been described, it should be noted that a number of changes and improvements can be made to the present invention without departing from the spirit and scope of the invention. Accordingly, the invention is not to be limited by the specific illustrated embodiment but by only the scope of the appended claims.

What is claimed is:

1. An apparatus for storing and handling a plurality of data cartridges comprising:
    plural carousel-type storage means each including plural columns of storage bins for storing said plurality of data cartridges, wherein each of said plural carousel-type storage means is rotatable to provide access to said plurality of data cartridges; and
    plural gripper means for moving said plurality of data cartridges to and from said plural carousel-type storage means, each of said plural gripper means associated with one of said plural storage means and capable of moving linearly along a first axis in order to access said plurality of data cartridges within said storage means; and
    plural conveyor means for moving data cartridges between said plural carousel-type storage means, each of said plural conveyor means associated with one of said plural carousel-type storage means and accessible by a respective one of said associated gripper means and constrained to move linearly along a second axis without rotation of data cartridges being moved by a respective one of the plural conveyor means to allow transfer of at least one of said plurality of data cartridges between said plural carousel-type storage means.

2. The apparatus of claim 1 wherein each of said plural gripper means further comprises:
    a gripper assembly for grasping at least one of said plurality of data cartridges;
    an extension axis assembly for moving said gripper assembly substantially linearly to and from said storage bins; and
    a vertical rail assembly for moving said extension axis assembly vertically between said storage bins.

3. The apparatus of claim 1 wherein each of said plural conveyor means further comprises:
    a frame assembly for receiving at least one of said plurality of data cartridges;
    a conveyor assembly for moving a received data cartridge horizontally along said frame assembly;
    a drive assembly for driving said conveyor assembly;
    a sensor assembly for sensing a position of a said data cartridge as it moves horizontally along said frame assembly; and
    a gate assembly for providing a reference for a said data cartridge during insertion on and removal from said conveyor means.

4. An apparatus for storing and handling a plurality of data cartridges comprising:
    plural storage assemblies for storing said plurality of data cartridges, each of said plural storage assemblies including a separate storage assembly having a plurality of storage locations for storing said plurality of data cartridges;
    plural gripper mechanisms for transporting one or more of said plurality of data cartridges to and from said plural storage assemblies, each of said plural gripper mechanisms associated with a respective one of said plural storage assemblies and capable of moving vertically to access said plurality of data cartridges within said respective one of said storage assemblies; and
    plural conveyor mechanisms constrained to linear motion for horizontally transporting at least one of said plurality of data cartridges along a linear path without rotation between said plural storage assemblies, each of said conveyor mechanisms associated with a respective one of said plural storage assemblies and positioned to enable transfer of said data cartridge between said plural storage assemblies, wherein the gripper mechanisms are separate from and do not move with the conveyor mechanisms.

5. The apparatus of claim 4 wherein each of said plural conveyor mechanisms comprises:
    means for receiving at least one of said plurality of data cartridges;
    conveyor means for horizontally transporting said data cartridges;
    means for driving said conveyor means;
    means for sensing position of data cartridges on said conveyor means; and
    means for controlling said means for driving in communication with said means for sensing position, said means for controlling capable of regulating a conveyance location of data cartridges on said conveyor means to allow proper positioning of data cartridges for being received by said means for receiving.

6. The apparatus of claim 5 wherein said means for controlling further comprises a gate assembly for providing a reference for data cartridges during said positioning.

7. The apparatus of claim 6 wherein said gate assembly comprises a single gate.

8. An apparatus for storing and handling a plurality of data cartridges, comprising:
    first and second storage libraries for storing said plurality of data cartridges, said first and second storage libraries including, respectively, first and second manipulators for receiving said data cartridges and transporting said data cartridges in a substantially vertical direction; and
    conveyor means, constrained for linear movement, for receiving data cartridges from said manipulators and for linearly transporting said data cartridges without rotation between said first and second storage libraries along a substantially horizontal axis, said horizontal axis being substantially perpendicular to said substantially vertical direction of said first and second manipulators.

9. The apparatus of claim 8 wherein said first and second storage libraries, said first and second manipulators and said conveyor means are configured to maintain said data cartridges in a substantially fixed orientation during handling by said first and second manipulators and conveyance along said conveyor means.

10. An apparatus for storing and handling a plurality of data cartridges comprising:
   plural storage means, each of said storage means including plural storage bins for storing said plurality of data cartridges;
   plural transport means, one associated with each storage means, for moving said data cartridges into and out of said plural storage bins;
   conveyor means, separate from the transport means, for moving data cartridges between said respective storage means, wherein said conveyor means is capable of receiving data cartridges from each of said transport means and is constrained to move in a linear direction; and
   at least one data transfer mechanism capable of receiving at least one of said plurality of data cartridges and capable of reading data from said data cartridges, wherein each of said at least one data transfer mechanism is capable of receiving data cartridges from a respective one of said transport means;
   wherein each of said transport means is capable of transporting data cartridges between a respective one of said storage bins, said conveyor means and a respective one of said at least one data transfer mechanism by moving substantially in a linear direction without rotating the transported data cartridges.

* * * * *